March 13, 1956 E. D. PARKER ET AL 2,737,673
SWEEPER
Filed Dec. 21, 1950 2 Sheets-Sheet 1

INVENTORS
EDWIN D. PARKER
EARL E. STELZER
BY
THEIR ATTORNEY

March 13, 1956  E. D. PARKER ET AL  2,737,673
SWEEPER
Filed Dec. 21, 1950  2 Sheets-Sheet 2
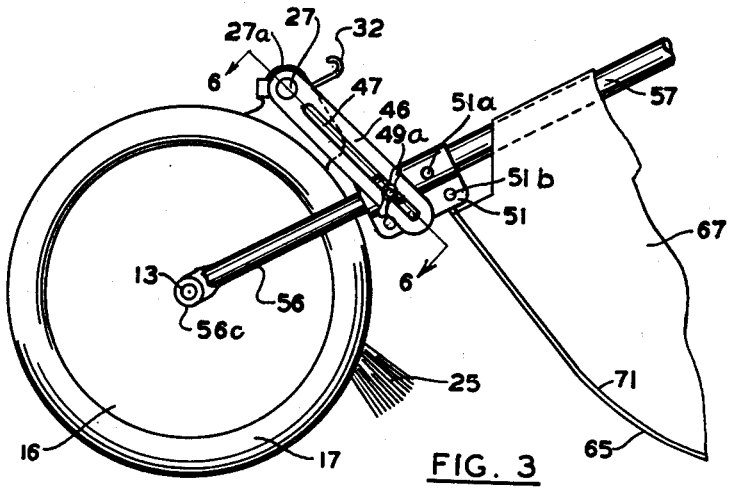
FIG. 3
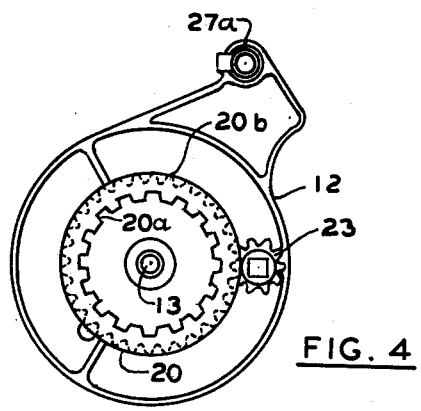
FIG. 4
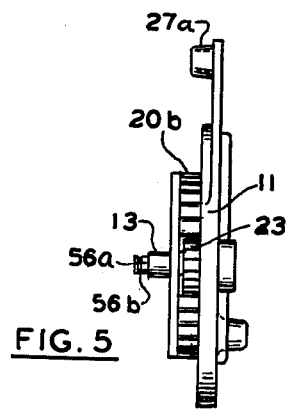
FIG. 5
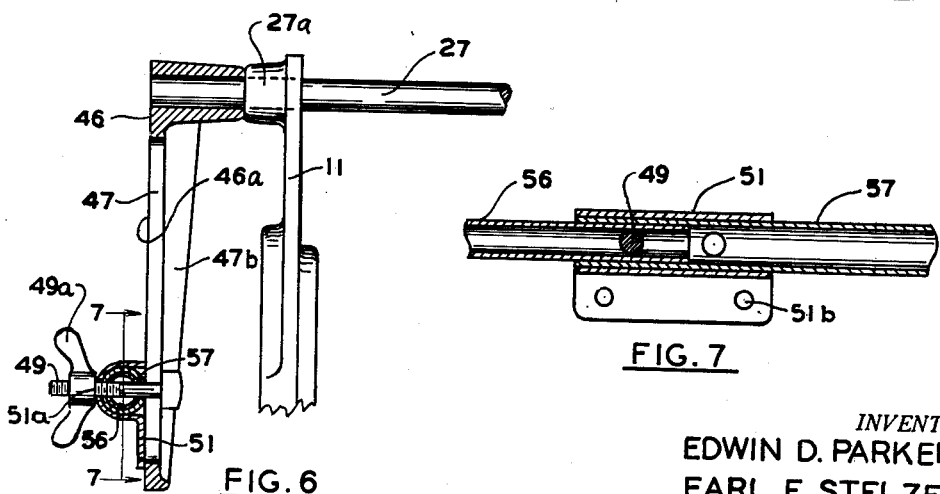
FIG. 6
FIG. 7
*INVENTORS:*
EDWIN D. PARKER
EARL E. STELZER
BY
THEIR ATTORNEY

United States Patent Office 2,737,673
Patented Mar. 13, 1956

2,737,673
SWEEPER

Edwin D. Parker and Earl E. Stelzer, Springfield, Ohio, assignors to Parker Sweeper Company, Springfield, Ohio, a corporation of Ohio Application December 21, 1950, Serial No. 201,955

2 Claims. (Cl. 15—79)

The present invention relates to a lawn sweeper and more particularly to mechanism for adjusting the relative height of the sweeping brush with respect to the ground over which the lawn sweeper is moved, and also relates to the fastening mechanism for the handle and the debris receptacle. The present application is a division of our co-pending application Serial Number 87,522, filed April 14, 1949 (now abandoned).

A lawn sweeper, of the character herein described, comprises a main frame, which houses the brush, wheels for supporting the main frame, a handle for manipulating the sweeper, and a debris receptacle for receiving the debris such as grass clippings, leaves, twigs, etc.

Obviously for shipping purposes, it is desirable to package the entire sweeper in a small carton and therefore, it is desirable that parts of the sweeper, such as the handle and debris receptacle, be packaged in a disassembled state. One of the objects of the present invention is to so construct the sweeper that parts thereof can be readily assembled by the purchaser of the partially dismantled machine.

It is desirable that the rotating brush of the sweeper be adjustable with respect to the ground level or the angle of the handle. Since the brush is carried by part of the main frame, if this part be raised or lowered, the brush will be raised or lowered with respect to the ground level. To provide for readily adjusting the height of the brush with respect to the ground level, the handle is connected at two points on the frame and one of these points is adjustable vertically with respect to the handle.

To provide for compactness in shipping the sweeper, the handle is constructed of telescoping sections which can be readily assembled or disassembled, and to provide for simplicity of design and construction, the same bolt which is utilized for connecting the handle to the bracket, is utilized for holding the telescoping sections of the handle in position.

Also to provide for compactness in shipping and simplicity in design and construction, the same bolt that is utilized for attaching the bracket to the handle and for holding the telescoping sections in position, is also utilized for holding a debris receptacle supporting bracket upon the handle.

Further objects and advantages of the present invention will be apparent from the following description, reference being had to the accompanying drawings wherein a preferred form of embodiment of the invention is clearly shown.

In the drawings:

Fig. 3 is a side view, on a larger scale, of the lower part of the sweeper;

Fig. 4 is a side elevational view of one of the side plates of the frame, the gear wheel, and the pinion for rotating the brush;

Fig. 5 is an end elevational view of the parts shown in Fig. 4, as viewed from the right side thereof;

Fig. 6 is a fragmentary sectional view taken on line 6—6 of Fig. 3; and

Fig. 7 is a sectional view taken on line 7—7 of Fig. 6.

Figure 1:
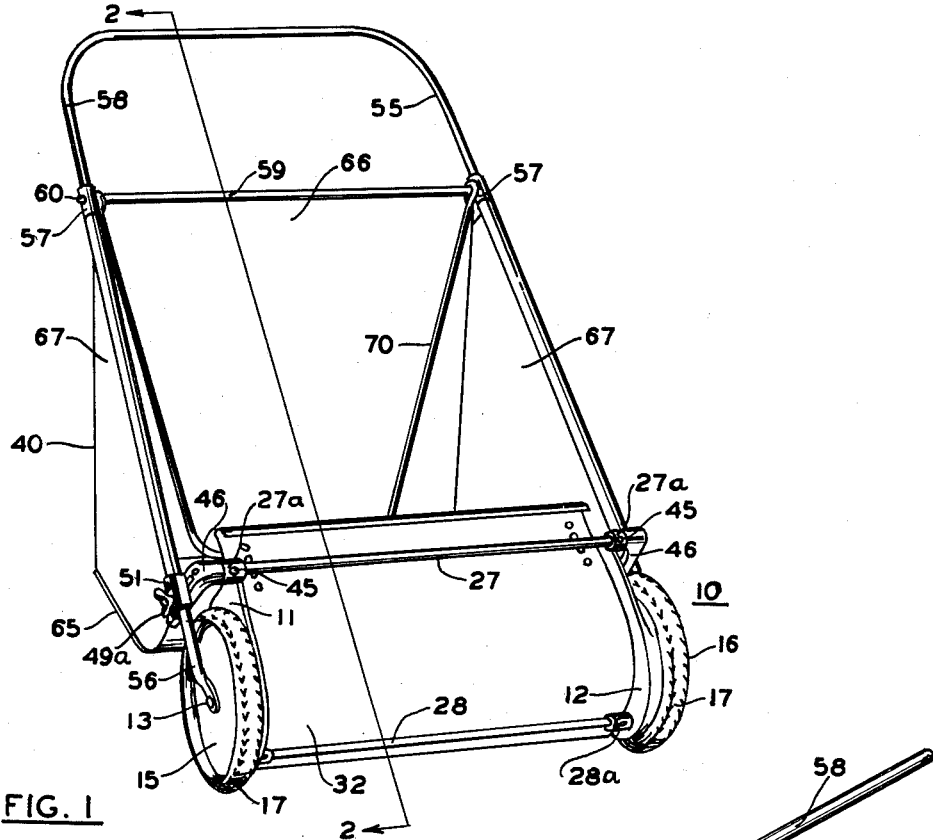
Fig. 1 is a perspective view of a sweeper constructed in accordance with the present invention.

Referring in detail to the drawings, the sweeper includes a main frame indicated generally at 10, and this frame includes a pair of oppositely disposed side plates 11 and 12. Each of these plates is cast with the stationary axle in a form of an insert 13 (see Fig. 5). A pair of spaced wheels 15 and 16 are rotatably mounted on the axles and are disposed on opposite sides of the frame. These wheels are encased in rubber tires 17 which rest upon the surface to be swept.

Each of the axles 13 rotatably carries a gear wheel 20. Pawls (not shown) are carried on the wheels 15 and 16 and are rotated with the wheels. These pawls engage the inner teeth 20a of the wheels 20 and provide for driving the gears in one direction only. A pinion gear 23 meshes with the outer teeth 20b of the gears 20 and the pinion gears rotate the reel shaft 24 upon which a brush 25 is mounted. Pinion gears 23 are suitably journaled in the side plates 11 and 12.

The side plates 11 and 12 are tied together by upper and lower tie rods 27 and 28. These rods are secured at each end with the side plates 11 and 12 by set screws in the hollow bosses 27a and 28a formed in each of the side plates. A shoulder 29, in the form of an arcuate shaped rib, projects inwardly from each of the side plates.

A handle, generally indicated at 55, is provided for manipulating the sweeper. This handle is generally U-shaped and the lower legs are carried by the axles 13. The handle is formed from tubular sections; the lower sections 56 are flattened at the lower end thereof and punched to provide openings of sufficient diameter to accommodate the ends of the axles 13. Each handle section 56 engages a shoulder 56a and is retained by a spring washer 56c fitting within the necks 56b of the axles. The upper end of each of sections 56 is drilled transversely. These ends of the sections 56 telescope with the lower ends of sections 57 which latter are also drilled to provide a transverse bore adapted to register with the drilled openings in the upper ends of sections 56. These sections are firmly secured by the bolt 49.

The bosses 27a are drilled, as indicated at 44 in Fig. 4 so that the ends of the tie rod 27 extend through the side plates 11 and 12. Set screws 45 in the bosses 27a retain the rod 27 in place. The brush adjusting brackets 46 are carried at each extending end of the tie rod 27. This bracket is in the form of an elbow having a downwardly extending portion 46a which is slotted at 47. A carriage bolt 49 has the shank portion thereof extending through the slot 47 and the head thereof is prevented from turning by the webs 47b. The bolt also extends through the telescoping sections 56 and 57 of the panel and through a bracket 51. The bracket 51 and the telescoping sections of the handle are held rigidly in position when a wing nut 49a is tightened against bracket 51.

The upper ends of sections 57 are drilled transversely. These ends of sections 57 are of sufficient diameter to receive the ends of U-shaped top handle section 58. The lower ends of section 58 are drilled to provide holes adapted to align with those provided in the upper end of section 56. In assembling, a tie or cross rod 59 is interposed between the upper end of the sections 57. The ends of this cross rod 59 are longitudinally drilled and internally tapped for receiving screws 60. These screws extend through the transversely drilled holes in the sections 57 and 58 for holding the sections in position and for drawing the handle section 57 tightly against the rod 59 and thereby hold the rod 59 in position.

The bracket 51 provided for each of the lower sections 56 of the handle has a curved top portion adapted to fit over the end of the handle section where the sections 56 and 57 telescope. The upper portion is drilled to provide an opening 51a (see Fig. 6) aligned with the transversely drilled openings in the telescoping sections 56 and 57 for receiving the bolt 49.

The debris receptacle 40 is formed with a flat bottom 65 of resilient sheet metal and is formed with canvas back and side walls as indicated at 66 and 67. The canvas back and side walls are formed with hems which receive the cross rod 59 and the handle sections 57. At the bottom the canvas is folded and the outer edges of bottom 65 crimped or folded over to grip the canvas. The upper extreme front end of the bottom 65 is rolled as at 68a to receive a support rod 68. The opposite ends of the rod extend beyond the sides of the receptacle bottom and these ends are received in holes 51b in brackets 51. In this manner the forward end of the debris receptacle is connected to the handle.

It will be noted that the bracket 51 is provided with a pair of openings 51a and a pair of openings 51b. One only of each pair of openings is utilized in a single bracket, however, by providing the pairs of openings, the brackets can be used for the left or right side of the machine.

A U-shaped rod 70 is provided to support the handle in raised or operative position and also maintain the collapsible debris receptacle in fully open position. Each of the upper ends of the U-shaped rod 70 is looped to freely receive the cross-rod 59. The bottom of the rod 70 which is substantially horizontal, rests against the inside of the bottom 65. When the rod 68 is connected to the bracket 51, the bottom 65, being held at the back by the rod 70, assumes the upwardly sloping curve indicated generally at 71 in Fig. 2. The upwardly sloping bottom thus provides for the ready sliding of the debris rearwardly in the receptacle and prevents spilling when sweeping over rough surfaces. Also when rod 70 is slung forwardly and out of engagement with the resilient bottom, the resilient bottom assumes its normal flat position, i. e., lies flat and the rear end thereof can be raised. By providing for collapsing the receptacle, the sweeper occupies a minimum of storage space.

Figure 2:
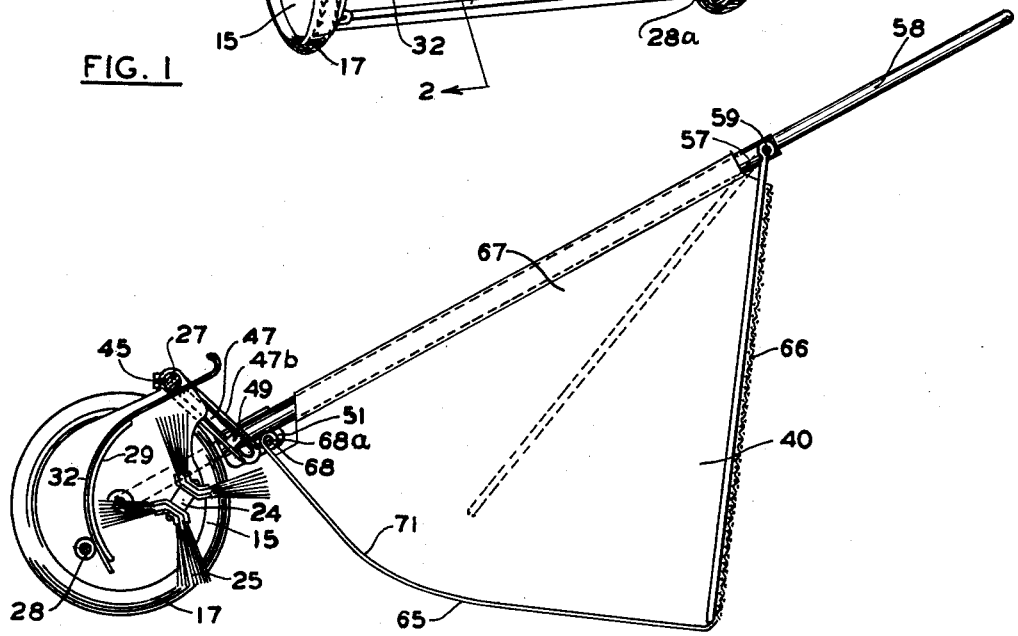
Fig. 2 is a vertical sectional view of the sweeper, partly in elevation, the section being taken on line 2—2 of Fig. 1.

The hood about the forward part of the brush 25, is formed from a thin flat sheet of resilient sheet metal. The lower end of the hood is inserted under the upper tie rod 27, over the shoulders 29, and under the lower shoulder 28a of the frame, as seen in Fig. 2. The retaining members 27, 28a and 29 support and form guide means which frictionally hold the hood arcuately in position, through the inherent resiliency of the hood.

The brush, as viewed in Fig. 2, rotates in a clockwise direction and the debris swept up by the brush is directed rearwardly into the debris receptacle 40 by the hood.

To adjust the height of the brush with respect to the ground level over which the sweeper operates, it is necessary only to loosen the wing nuts 49a which will permit a shifting of the frame about the axles 13. For example, if the rear part of the frame plates 11 and 12 are pushed downwardly, about the axles 13, the brush reel 24 will be moved downwardly, or if the rear part of the frame is shifted upwardly, the brush reel 24 will be raised. When the brush is adjusted to the desired height, the wing nuts 49a are again tightened. This shifting or raising and lowering of the brush, is made possible by the fact that the handle is connected at two places to the frame, namely at the axle and at a point remote from the axle through the adjusting brackets 46.

From the foregoing it will be seen that the brackets 51 for carrying the front part of the debris receptacle, the telescoping handle sections 56 and 57 and the adjustable brackets 46 are all held in position by a single pair of bolts. Also it is merely necessary to loosen these same bolts in order to permit the shifting of the frame for the ready adjustment of the height of the brush with respect to the surface being swept.

While the form of mechanisms of the present invention as herein disclosed constitutes a preferred form, it is to be understood that other forms might be adopted, all coming within the scope of the claims which follow.

We claim:

1. A lawn sweeper, comprising in combination, a frame; axle means carried by the frame and wheels mounted on said axle means; a handle including telescoping sections and having a lower end pivotally mounted to the frame and extending upwardly-rearwardly from said frame; a rotating brush mounted on the frame eccentric to and rearward of said pivotal mounting of the handle; a brush adjusting bracket having one end pivotally mounted to a point on the frame eccentric to and rearward of said pivotal mounting of the handle, with the other end of said bracket being slotted and extending to engage the handle at a location intermediate the pivotal mounting of the handle and the upper end of the latter; and fastening means for interlocking the telescoping handle sections and for holding the brush adjusting bracket in adjusted position, said fastening means including a bolt and nut, said bolt passing through the slot and both of said telescoping sections of the handle, said fastening means being releasable for adjusting the brush height by rotating the frame relative to the handle about said pivotal mounting of the handle.

2. A lawn sweeper, comprising in combination, a frame; axle means carried by the frame and wheels mounted on said axle means; a handle including telescoping sections and having a lower end pivotally mounted to the frame and extending upwardly-rearwardly from said frame; a debris receptacle and a mounting bracket for attaching said receptacle to the handle; a rotating brush mounted on the frame eccentric to and rearward of said pivotal mounting of the handle; a brush adjusting bracket having one end pivotally mounted to a point on the frame eccentric to said pivotal mounting of the handle, with the other end of said bracket being slotted and extending to engage the handle at a location intermediate the pivotal mounting of the handle and the upper end of the latter; and fastening means for interlocking the telescoping handle sections and for holding the brush adjusting bracket in adjusted position, said fastening means including a bolt and nut, said bolt passing through the slot, said mounting bracket and both of said telescoping sections of the handle, said fastening means being releasable for adjusting the brush height by rotating the frame relative to the handle about said pivotal mounting of the handle.

References Cited in the file of this patent

UNITED STATES PATENTS

| 611,586 | Atkinson | Sept. 27, 1898 |
| 666,689 | Phillips | Jan. 29, 1901 |
| 1,185,732 | Swayne | June 6, 1916 |
| 1,507,317 | Laberge | Sept. 2, 1924 |
| 1,911,535 | Schultze | May 30, 1933 |
| 2,552,382 | Root | May 8, 1951 |
| 2,654,106 | Parker | Oct. 6, 1953 |

FOREIGN PATENTS

| 24,668 | Great Britain | of 1911 |
| 73,426 | Germany | Mar. 7, 1894 |
| 788,628 | France | Oct. 14, 1935 |